(12) United States Patent
Loveless

(10) Patent No.: US 6,444,955 B1
(45) Date of Patent: Sep. 3, 2002

(54) COOKING ENHANCING CONVECTION OVEN AND METHOD OF ENHANCING THE COOKING IN A CONVECTION OVEN

(75) Inventor: Gerald Loveless, Lakewood, WA (US)

(73) Assignee: Ultravection International, Inc., Tacoma, WA (US)

( * ) Notice: Subject to any disclaimer, the term of this patent is extended or adjusted under 35 U.S.C. 154(b) by 0 days.

(21) Appl. No.: 09/672,117

(22) Filed: Sep. 27, 2000

(51) Int. Cl.$^7$ .............................................. A21B 1/26
(52) U.S. Cl. ...................... 219/400; 99/447; 126/214
(58) Field of Search ........................ 219/400; 126/21 A, 126/21 R; 99/474–476

(56) References Cited

U.S. PATENT DOCUMENTS

| | | | |
|---|---|---|---|
| 3,658,050 A | 4/1972 | Snyder | 126/340 |
| 3,783,219 A | 1/1974 | Tateda | 219/10.55 |
| 3,820,525 A | 6/1974 | Pond | 126/21 A |
| 4,071,738 A | 1/1978 | Jenn et al. | 219/400 |
| 4,149,518 A | 4/1979 | Schmidt et al. | 126/190 |
| 4,295,419 A | 10/1981 | Langhammer | 99/427 |
| 4,308,853 A | 1/1982 | Thirode | 126/21 A |
| 4,335,292 A | 6/1982 | Tanaka et al. | 219/10.55 F |
| 4,357,522 A | 11/1982 | Husslein et al. | 219/400 |
| 4,444,094 A | 4/1984 | Baker et al. | 99/327 |
| 4,465,701 A | 8/1984 | Holman et al. | 426/523 |
| 4,481,405 A | 11/1984 | Malick | 219/405 |
| 4,491,065 A | 1/1985 | Poulson | 99/327 |
| 4,683,871 A | 8/1987 | Salvi | 126/340 |
| 4,814,571 A | 3/1989 | Bowen et al. | 219/10.55 R |
| 4,824,644 A | 4/1989 | Cox et al. | 422/300 |
| 4,829,158 A | 5/1989 | Burnham | 219/400 |
| 4,862,792 A | 9/1989 | Lerma, Jr. | 99/401 |
| 4,865,864 A | 9/1989 | Rijswijck | 426/520 |
| 4,894,207 A | 1/1990 | Archer et al. | 422/292 |
| 5,066,851 A | 11/1991 | Darvin | 219/400 |
| 5,134,927 A * | 8/1992 | McCarthy et al. | 126/21 A |
| 5,142,125 A | 8/1992 | Fioroli et al. | 219/400 |
| 5,144,105 A | 9/1992 | Briggs et al. | 219/10.55 D |
| 5,204,503 A | 4/1993 | Maiellano, Jr. et al. | 219/10.55 B |
| 5,254,823 A | 10/1993 | McKee et al. | 219/10.55 R |
| 5,309,981 A | 5/1994 | Binder | 265/64 |
| 5,339,726 A * | 8/1994 | Poulson | 219/400 |
| 5,434,390 A | 7/1995 | McKee et al. | 219/681 |
| 5,586,488 A | 12/1996 | Liu | 99/331 |
| 5,601,070 A | 2/1997 | Hotard et al. | 126/21 A |
| 5,620,623 A | 4/1997 | Baker | 219/400 |
| 5,674,421 A | 10/1997 | Beaver, II et al. | 219/385 |
| 5,676,870 A | 10/1997 | Wassmann et al. | 219/400 |
| 5,793,019 A | 8/1998 | Boyle et al. | 219/400 |
| 5,910,264 A | 6/1999 | Dauliach | 219/411 |
| 6,057,528 A | 5/2000 | Cook | 219/405 |

FOREIGN PATENT DOCUMENTS

| WO | WO 87/01186 | 2/1987 |
|---|---|---|
| WO | WO 93/18349 | 9/1993 |

* cited by examiner

Primary Examiner—Joseph Pelham
(74) Attorney, Agent, or Firm—Seed Intellectual Property Law Group PLLC

(57) ABSTRACT

A convection oven is provided with a fan for circulating air in the cooking chamber of the oven. The food is held in a food holder which is attached to but spaced from the inside surface of the oven door. Heating elements are at the top and the bottom of the cooking chamber. A flue opening is in the bottom of the cooking chamber and the heating elements are positioned above the lengthwise lower ends of the flue opening for inducing external air around the lower heating elements and the lower surface of the food and food holder. A method is disclosed for introducing external air into the bottom of a convection heating oven, to cool the lower surface of the food in the oven and provide turbulence to the circulating air for enhancing the cooking of the food.

18 Claims, 5 Drawing Sheets

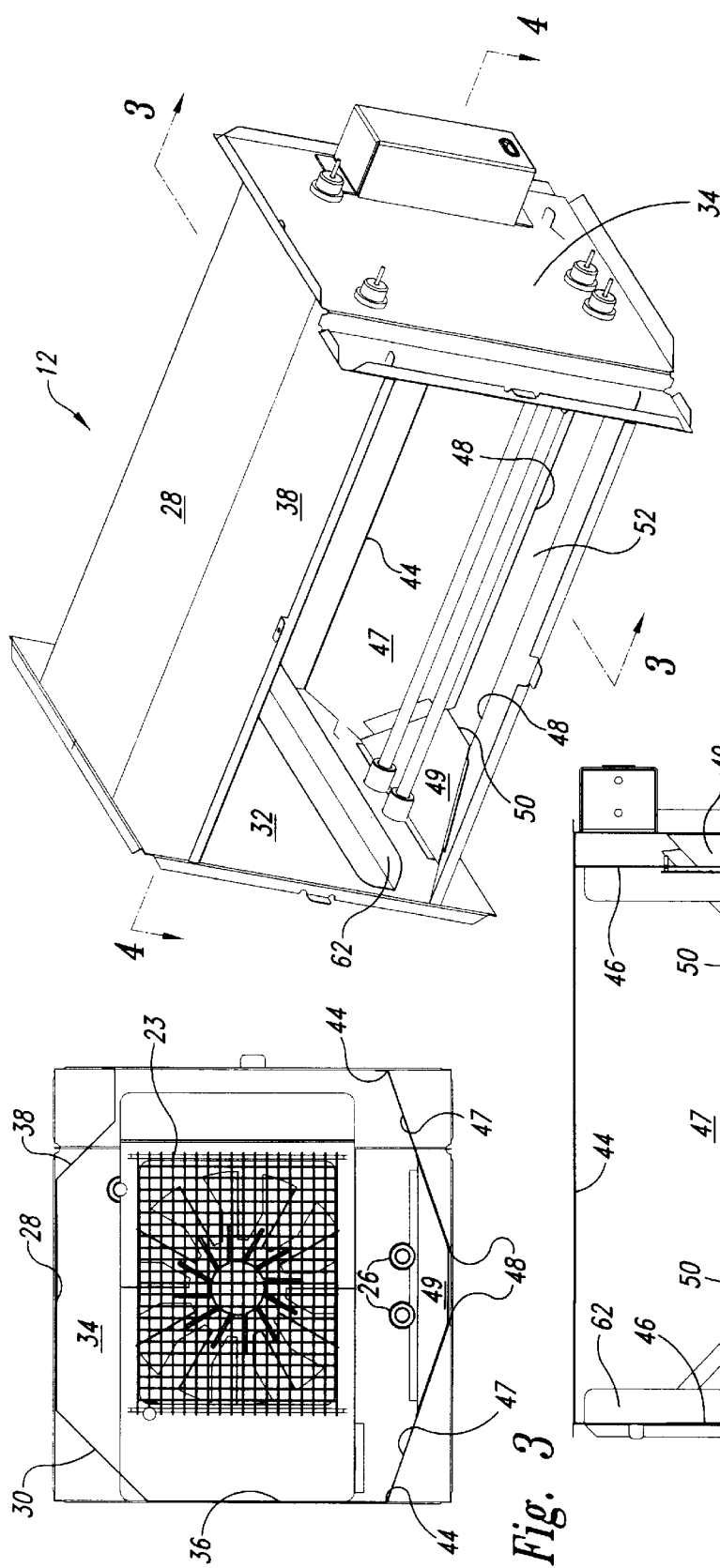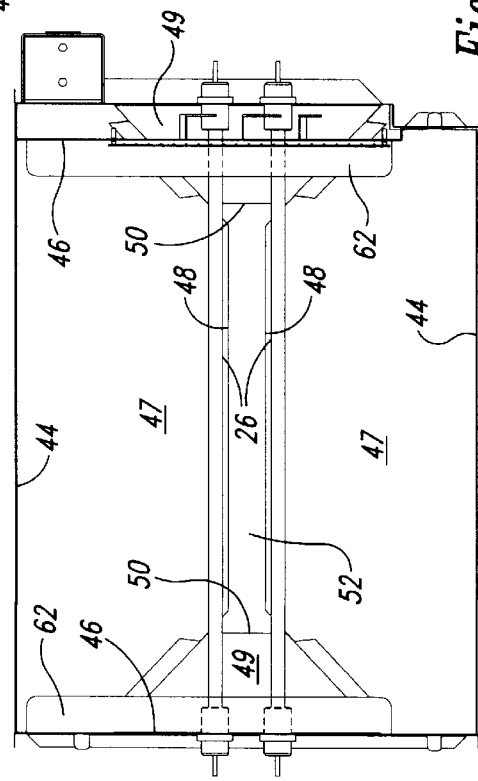

COOKING ENHANCING CONVECTION OVEN AND METHOD OF ENHANCING THE COOKING IN A CONVECTION OVEN

TECHNICAL FIELD

This invention relates to convection ovens for cooking foods and methods of enhancing the cooking in a convection oven.

BACKGROUND OF THE INVENTION

U.S. Pat. No. 5,676,870 discloses a convection oven for cooking foods in which air is circulated in a cooking chamber where a food holder, such as a basket, holds the food to be cooked. While this patent discloses an oven that enhances the cooking of the food, the cooking can be further enhanced by introducing external air into the cooking chamber through a flue at the bottom of the chamber. The cooking can also be enhanced by spacing the food holder a distance away from the front and back walls of the cooking chamber.

SUMMARY OF THE INVENTION

This invention provides a flue at the bottom of the oven to introduce cooler external air into the cooking chamber of a convection oven in the vicinity of the lower heating elements of the oven. Preferably the air is introduced through a flue opening located in the bottom of the oven. The oven also has a drip tray located below the flue opening. A sloping bottom wall allows food drippings to gravitate downwardly out the opening. It has been found that by introducing external air in through the bottom of the cooking chamber in the vicinity of the lower heating elements of the oven, that cooler air mixes with the turbulent heated air circulating in the oven to enhance the cooking of the food by better mixing of the air and cooling the food holder and the lower surface of the food above the lower heating elements.

A second feature of the invention is to provide a food holder configured and sized so as to provide air circulation gaps between the front and rear holder sides and the adjacent sides of the cooking chamber for enhanced cooking uniformity of the food in the food holder.

BRIEF DESCRIPTION OF THE DRAWINGS

FIG. 3 is a vertical section taken along the line 3—3 of FIG. 5.

FIG. 4 is a horizontal section taken along the line 4—4 of FIG. 5.

FIG. 5 is an isometric view with parts removed for clarity.

DETAILED DESCRIPTION OF THE INVENTION

Figure 1:
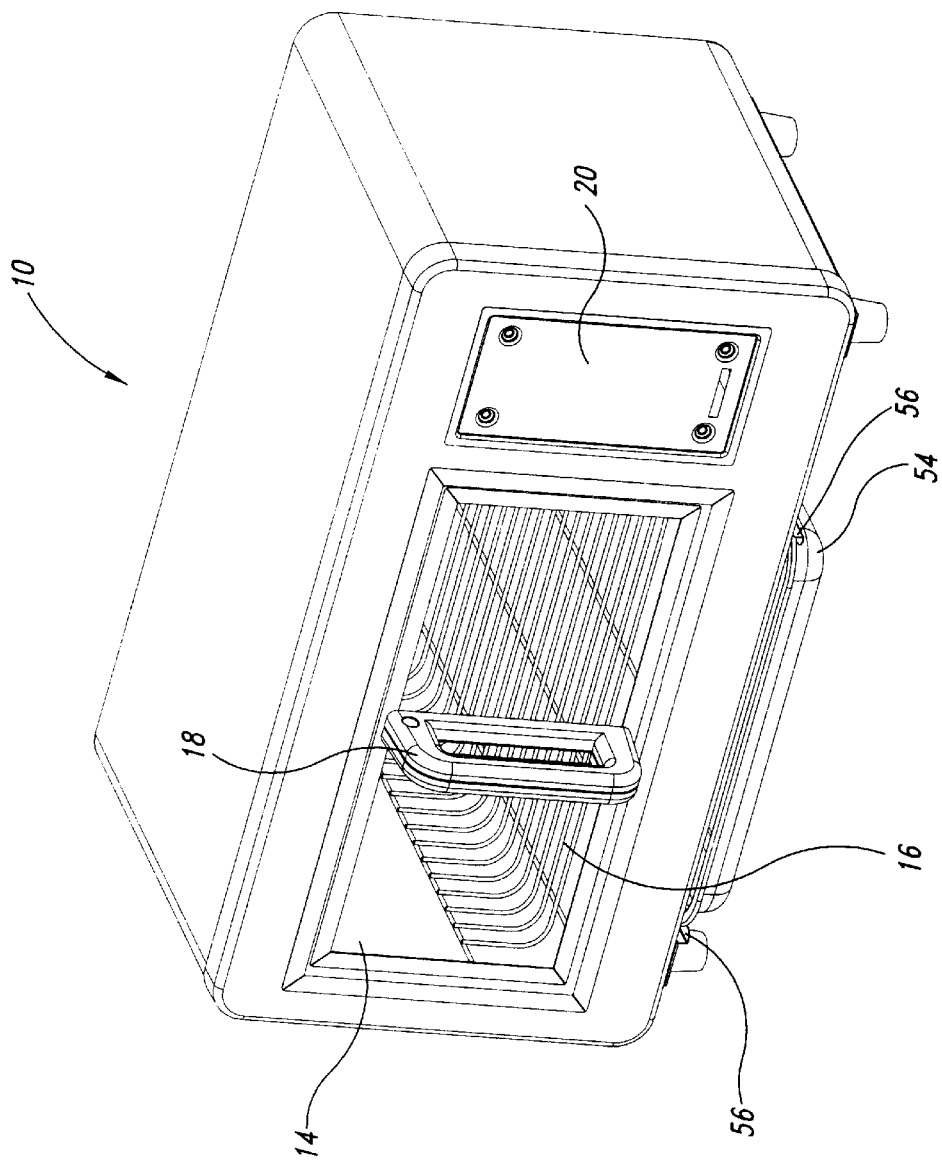
FIG. 1 is an isometric view of a convection oven embodying the principles of the invention.

The convection oven 10 includes a cooking chamber 12 of the type shown in the U.S. Pat. No. 5,676,870. The front of the cooking chamber is closed by a door 14, which in one form of the invention, has fixed thereto a food holder or basket 16. The door is opened and closed by a handle 18. A control panel 20 of the type in U.S. Pat. No. 5,676,870 is provided in the front of the oven. It will be understood that basically the oven as thus far described operates in a manner like that in the patent, the disclosure of which is incorporated herein by reference thereto.

Figure 2:
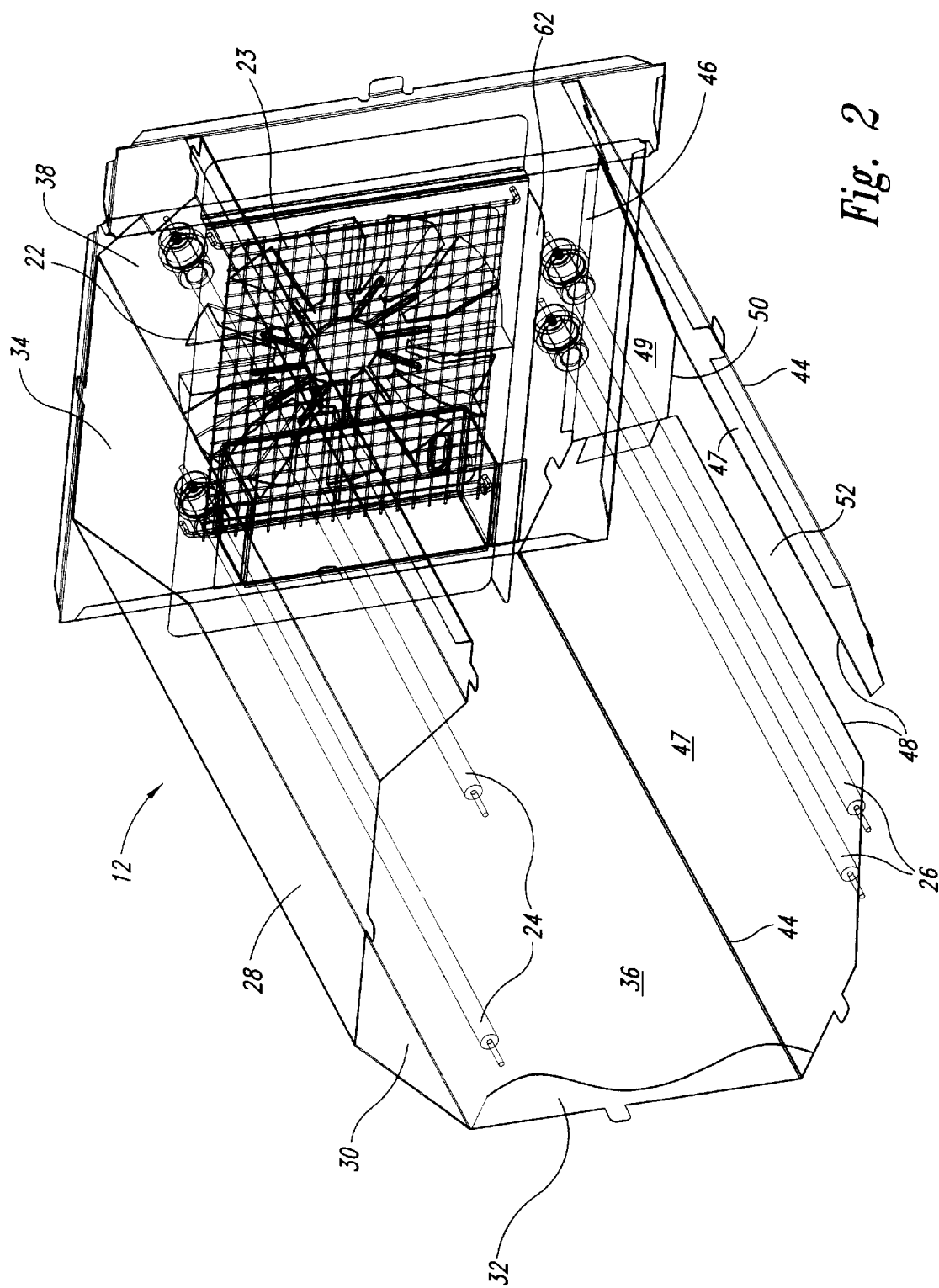
FIG. 2 is a schematic isometric of the cooking chamber with parts broken away for clarity.

A fan 22 circulates air in the cooking chamber. A protective screen 23 separates the fan from the food holding basket. Upper and lower heating elements 24 and 26, respectively, provide heat to the circulating air and food holder and thus cook the food in the food holder as is well known. The cooking chamber has a top wall 28, an upper rear sloped wall 30, opposite end walls 32 and 34, a rear wall 36 and an upper front sloped wall 38. The form of the walls are preferably octagonal in shape as shown by FIG. 2.

At the bottom of cooking chamber 12 a flue opening is formed, in part, by spaced lengthwise upper edges 44 and spaced widthwise upper edges 46 of the bottom wall. These edges are at the top of downwardly sloping surfaces 47 and 49, respectively, and terminate at lower lengthwise edges 48 and lower widthwise edges 50 which define flue opening 52.

The orientation of the lower heating elements 26 are parallel to the lower lengthwise edges 48 of the flue opening 52 and approximately vertically located over the lower lengthwise edges 48, as best shown in FIGS. 3 and 4. The location of each lower heating element 26 along the width of the cooking chamber, as viewed in FIG. 3, should be positioned where the vertical plane from each lower lengthwise edge 48 of the flue intersects the horizontal plane from each lengthwise upper edge 44 of the flue, on each side respectively. The location of each lower heating element 26 along the height of the cooking chamber should be between 30% and 70% of the distance between the lower lengthwise edge 48 of the flue opening 52 and the bottom of the basket 16, on each side respectively, as viewed in the embodiments of FIGS. 3 and 8.

The flue opening allows for the removal of drippings from the cooked food reducing potential smoking, and induces external air into the cooking chamber in the vicinity of the lower heating elements. The induction of external air causes turbulence in the air around the lower heating elements and the lower area of the food holder and food to minimize charring of the food and better distribute the heat into the food.

A removable drip tray 54 is positioned on spaced rails 56 below the flue opening to collect the drippings from the cooked food.

The lateral spacing between lower heating elements 26, in a preferred embodiment, is wide enough to provide even cooking of the lower surfaces of foods placed in basket 16, but close enough to transfer most of their heat into foods being cooked rather than into the cooking chamber walls, and to establish good cool air induction characteristics thereby, among other things, preventing overcooking of the lower food surfaces.

Figure 8:
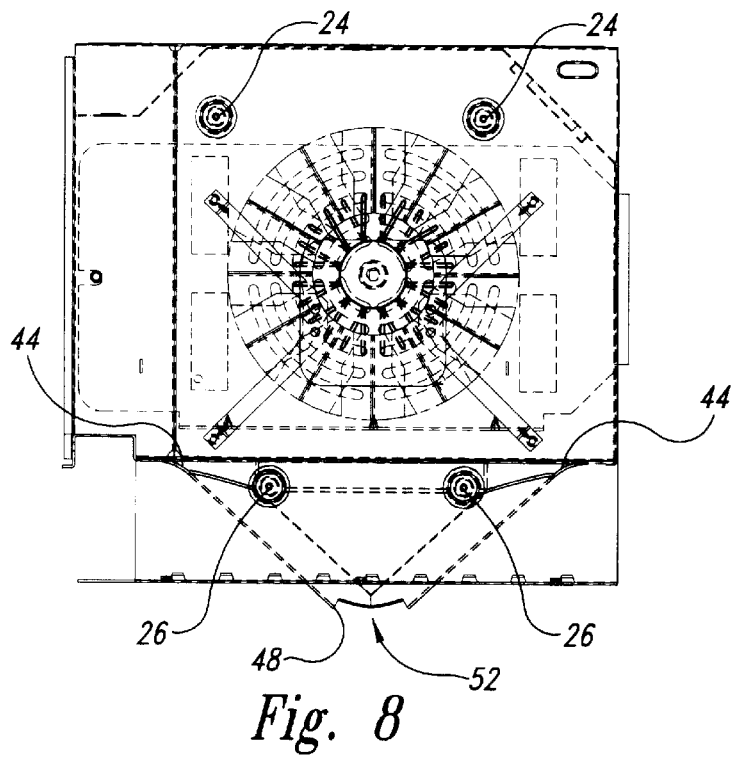
FIG. 8 is an end view of an alternate embodiment of the cooking chamber.
Figure 9:
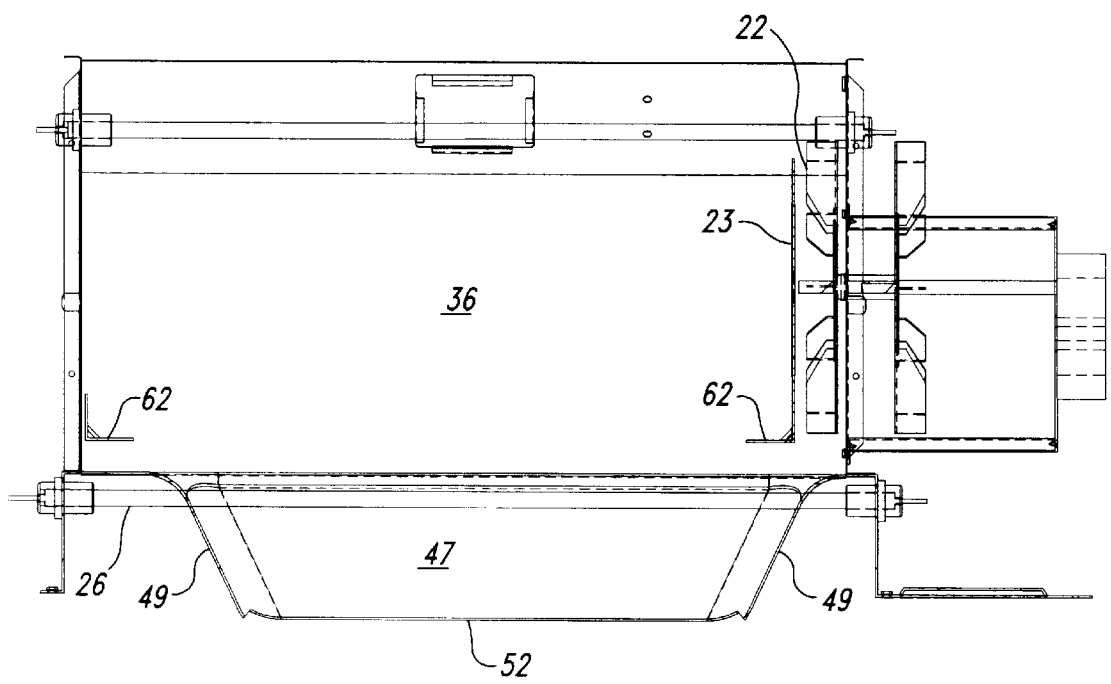
FIG. 9 is a side view showing the alternate embodiment.

As noted earlier, the lower heating elements are located vertically above the longer edges of flue opening 52 and below the bottom surface of basket 16. In a smaller oven, a typical distance from the basket to heating elements can be approximately 1.5" (selected to prevent burning or premature crisping), and approximately 6.0" below the upper heating elements. The flue opening can extend to run substantially the full length of the food basket so that the cooler induced air prevents overcooking of the entire lower food surface area within the basket. In its width, the flue opening is sized to permit sufficient quantity of induced air to flow into the chamber, but limited by the need to prevent too much heat from escaping so efficiency is maintained. A typical sizing for flue opening 52 can be approximately 0.75" by 7.0". The spacing of elements 26 above the longer or lengthwise edges of the flue opening 52 can vary but will fall within a range of approximately 1.5" to 3.0" for a smaller capacity consumer-type oven. In the embodiment of FIGS. 1–5, the heating elements 26 are nearly aligned with the lengthwise edges 48 of the flue opening and are about 1.5" above the lengthwise edges 48. In the embodiment of FIGS. 8 and 9, this height above the lengthwise edges is approximately 3". The location of the upper heating elements, wattages, fan size and speed variability, and control features may be selected and sized by reference to the disclosure in U.S. Pat. No. 5,676,870.

The cooking chamber 12 of the preferred consumer oven embodiment, designed to utilize 110V service, will be approximately 12" long, 8½" high and 8" deep. Effective heating element wattages for this consumer oven will be to utilize not less than four 300 watt to no greater than four 400 watt elements with a typical diameter of approximately 3/16" to 5/16". However, a cooking chamber with internal dimensions of as little as 8" long×8" high×8" deep, utilizing lower wattage elements of four 300 watts each will produce an effective design that will produce the desired cooking performance.

In the preferred embodiment, the upper elements 24 would be located within an octagonal shaped cooking chamber as taken by a section taken perpendicular to the oven's longitudinal axis. The effective element locations from either of the upper two corners of this octagonal section would be a distance of not more than 5.5 element diameters for a 3/16" diameter element or 3.2 element diameters for a 5/16" diameter element but not less than 2.7 element diameters for a 3/16" diameter element and not less than 2 element diameters for a 5/16" diameter element. The preferred element distances, however, fall at mid point between these aforementioned ranges. The element locations should be equidistant to both the nearest canted wall and the upper wall surface so that a line taken from the focal point of the octagon's closed angle to the center line of the element would equally bisect the angle formed by these two adjacent octagonal wall segments. This equidistant location will assure that uniform radiant heat is reflected from both adjacent wall segments. The minimum distance will assure that adequate airflow is able to surround the element as induced by fan 22. The maximum distance is set to optimize the radiant heating effect off the nearest wall surfaces and to avoid searing the upper surfaces of foods cooked in the basket. The minimum length of the cooking elements would be to extend the full length of basket 16, so that uniform convective, radiant and conductive heating of all food surfaces occurs.

The oven's minimum food basket dimensions are selected based on the practical containment size needed to accommodate larger foods such as large T-bone steaks (i.e., approximately 7½"×7½"×1" high). The maximum basket dimensions are selected based on the cooking chamber's length and depth. The maximum basket length can be equal to the oven chamber length, less ¼" clearance from the fan screen 23 and ¼" from the opposite end wall 32. The maximum basket depth (i.e., front to back) would be the entire cooking chamber's depth, less a selected clearance from the front interior door wall and the back wall of the oven to cause the food to be located optimally within the flow of hot convective, turbulent air as further described below. The maximum basket height can be the same height as the door to which it is integrally connected and it can have a minimum side wall height of approximately ½" to contain foods within the basket. The preferred basket composition would be of an open wire mesh construction of various possible wire gauge to spacing relationships so long as a minimum of 50% free area is maintained to allow the free flow of convective air to have access to the foods cooked.

The fan size needs to be of a capacity to circulate air at between approximately 3 and 20 cubic feet per minute. The motor driving the fan should be a high temperature, adjustable speed type as different fan speeds create diverse cooking results that are preferred for diverse foods cooked within the oven. The fan speed could be adjusted by electrical modulation controls associated with the oven's programmable cooking hardware. A typical fan blade diameter is 4.75" for the preferred embodiment. A typical preferred rpm could be 800 to 1600 rpm.

Figure 6:
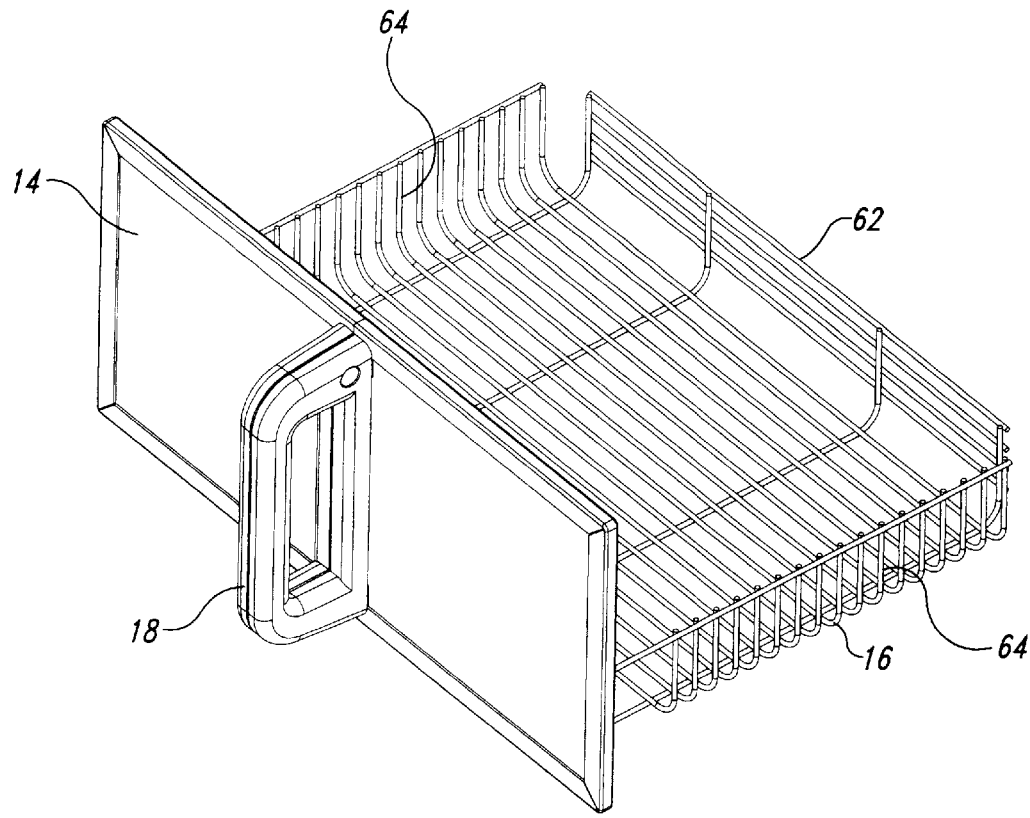
FIG. 6 is an isometric view of the integral door and food holder or basket.
Figure 7:
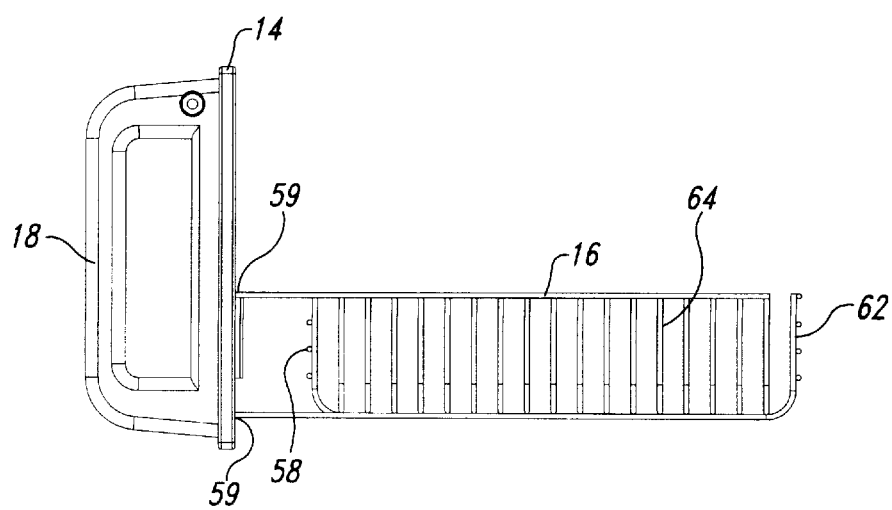
FIG. 7 is a side view of the door and food basket.

Turning now to FIGS. 6 and 7, the improvement in the door and food holding basket as disclosed in U.S. Pat. No. 5,676,870 is shown. Cooking chamber 12 has an "optimal cooking zone" that includes the entire volume of the chamber less the volume occupied by front and back areas, approximately ¾" in depth, adjacent the inside surfaces of the door and back wall. These areas are found to heat non-uniformly as they are located furthest from the heating elements and drag effects of the front and back walls of the cooking chamber, especially at high fan speeds, impedes the flow of convective, turbulent air. The consistency of the oven's cooking performance is enhanced when the food is located within this zone. Food basket 16 has a vertical front open side wall 58 spaced from the adjacent interior surface of door 14 a distance of approximately ¾" to 1". Basket 16 is attached to door 14 at connection points 59 and extends away from door 14 a distance less than the width dimension of cooking chamber 12 where it terminates at vertical back open side wall 60. When the integral door-basket is properly closed and positioned within the chamber there will likewise be a space of approximately ¾" to 1" from side wall 60 on the basket to the back wall 36 of cooking chamber 12. Vertical open end walls 64 on basket 16 are spaced apart a distance to fit the length of chamber 12 as previously noted. The basket is slid into place on a pair of opposed slide rails 62.

Turning to FIGS. 8 and 9, a slightly different construction of the flue opening assembly is depicted. The same elements are utilized, however, the top edges 44, 46 of downwardly sloping surfaces 47 and 49 are positioned inwardly relative to the cooking chamber front, rear and end walls and result in a greater downward slope leading to flue opening 52. In addition, heating elements 26 extend through apertures in surfaces 49 as best seen in FIG. 9. This particular configuration provides the same operating results of inducing external air flow into the cooking chamber and removal of food drippings and other particles.

In changing the size of oven 10, for example, to make and use an oven with varying cooking chamber volumes (such as 0.5 cubic feet, 0.75 cubic feet, and 1.0 cubic feet) for cooking larger amounts of food, one with ordinary skill in the art will be readily able to make and use an oven of preselected size/capacity incorporating the present invention.

While preferred embodiments of the invention have been shown and described, it should be understood that variations will be apparent to one skilled in the art that will be equivalent to the specific embodiments disclosed. Thus, the invention is not to be limited to the embodiment shown in the drawings.

What is claimed is:

1. A convection oven having a cooking chamber, the cooking chamber having a back wall, front wall, opposite left and right end walls, a top wall and a bottom wall;
   a food holder in the cooking chamber, the food holder having a bottom;
   upper and lower heating elements in the cooking chamber spaced respectively above and below the food holder;
   a fan for circulating air in the cooking chamber around the food holder and the heating elements; and
   a flue opening in the bottom wall having opposite upper lengthwise edges, opposite upper widthwise edges, opposite lower lengthwise edges, and opposite lower widthwise edges for admitting external air into the cooking chamber adjacent to the lower heating elements, the lower heating elements lying parallel and adjacent to the upper lengthwise edges.

2. The oven of claim 1, said flue opening having downwardly sloping side walls extending down from the upper lengthwise side edges to the lower lengthwise edges.

3. The oven of claim 2, said flue opening further including downwardly sloping end walls sloping downwardly from the upper widthwise edges of the flue opening to the lower widthwise edges.

4. The oven of claim 2, wherein said lower heating elements approximately overlying the lower lengthwise edges of the downwardly sloping side walls of the flue opening.

5. The oven of claim 1, further comprising a first and second lower heating element, said first lower heating element being positioned depth-wise in the cooking chamber from the front wall at a point intersecting a first vertical plane and a horizontal plane, where the first vertical plane extends from a front lower lengthwise edge of the flue opening and the horizontal plane extends from the upper lengthwise edges of the flue opening; and
   said second lower heating element is positioned depth-wise in the cooking chamber from the back wall at a point intersecting a second vertical plane and the horizontal plane, where the second vertical plane extends from a back lower lengthwise edge of the flue opening.

6. The oven of claim 1, each said lower heating element positioned vertically within the cooking chamber below the food holder at a location that is 30% to 70% of a distance from the bottom of the food holder to the lower lengthwise edges of the flue opening.

7. The oven of claim 6, further comprising a first and second lower heating elements, said first lower heating element being positioned depth-wise in the cooking chamber from the front wall at a point intersecting a first vertical plane and a horizontal plane, where the first vertical plane extends from a front lower lengthwise edge of the opening and the horizontal plane extends from the upper lengthwise edges of the flue opening; and
   said second lower heating element is positioned depth-wise in the cooking chamber from the back wall at a point intersecting a second vertical plane and the horizontal plane, where the second vertical plane extends from a back lower lengthwise edge of the flue opening.

8. A convection oven comprising:
   a cooking chamber, the cooking chamber having a back wall, front wall, opposite left and right end walls, a top wall and a bottom wall;
   a food holder in the cooking chamber;
   upper and lower heating elements in the cooking chamber spaced respectively above and below the food holder;
   a fan for circulating air in the cooking chamber around the food holder and the heating elements; and
   a flue opening in the bottom wall for admitting external air into the cooking chamber adjacent to the lower heating elements, the lower heating elements lying parallel and adjacent to opposite lower lengthwise edges of the flue opening.

9. The oven of claim 8, further comprising:
   a first and second lower heating element, the first lower heating element being positioned depth-wise in the cooking chamber from the front wall at a point intersecting a first vertical plane and a horizontal plane, where the first vertical plane extends from a front lower lengthwise edge of the flue opening and the horizontal plane extends from an upper lengthwise edge of the flue opening; and
   said second lower heating element is positioned depth-wise in the cooking chamber from the back wall at a point intersecting a second vertical plane and the horizontal plane, where the second vertical plane extends from a back lower lengthwise edge of the flue opening.

10. The oven of claim 8, wherein each said lower heating elements is positioned vertically within the cooking chamber below the food holder at a location that is 30% to 70% of a distance from a bottom of the food holder to the lower lengthwise edges of the flue opening.

11. The oven of claim 9, wherein each of the lower heating elements is positioned vertically within the cooking chamber below the food holder at a location that is 30% to 70% of a distance from a bottom of the food holder to the lower lengthwise edges of the flue opening.

12. The oven of claim 8, further comprising:
   a drip tray positioned below the flue opening.

13. A method of enhancing the cooking of food in a food holder located in a cooking chamber of a convection oven, the cooking chamber having a bottom wall, comprising:
   internally heating the cooking chamber above and below the food holder;
   circulating air around the cooking chamber to enhance the heating of the food in the food holder;
   introducing external air into the cooking chamber through a flue opening in the bottom wall below the food holder to increase turbulence of the air below the food holder and reduce the heat below the food holder.

14. The method of claim 13, said step of circulating air around the cooking chamber including the step of blowing the air with a fan in the cooking chamber.

15. The method of claim 13, further comprising:
   placing a drip tray below the flue opening.

16. A convection oven comprising:
   a cooking chamber, the cooking chamber having a back wall, front wall, opposite left and right end walls, a top wall and a bottom wall;
   a food holder in the cooking chamber;
   upper and lower heating elements in the cooking chamber spaced respectively above and below the food holder;
   a fan for circulating air in the cooking chamber around the food holder and the heating elements; and
   a flue opening in the bottom wall for admitting external air into the cooking chamber adjacent to the lower heating elements, the flue opening extending substantially the full length of the food holder.

17. The oven of claim 16, wherein the lower heating elements are parallel and adjacent to opposite lower lengthwise edges of the flue opening.

18. The oven of claim 16, further comprising:
   a trip tray positioned below the flue opening.

* * * * *

UNITED STATES PATENT AND TRADEMARK OFFICE
CERTIFICATE OF CORRECTION

PATENT NO. : 6,444,955 B1
DATED : September 3, 2002
INVENTOR(S) : Gerald Loveless It is certified that error appears in the above-identified patent and that said Letters Patent is hereby corrected as shown below:

Column 5,
Line 51, "edge of the opening" should read -- edge of the flue opening --.

Column 6,
Line 65, "a trip tray positioned" should read -- a drip tray position --.

Signed and Sealed this

Eighth Day of July, 2003

JAMES E. ROGAN
*Director of the United States Patent and Trademark Office*